(12) United States Patent
Hull et al.

(10) Patent No.: US 8,803,384 B2
(45) Date of Patent: Aug. 12, 2014

(54) STATORS WITH RECONFIGURABLE COIL PATHS

(75) Inventors: John R. Hull, Sammamish, WA (US); John F. Gonder, Mountlake Terrace, WA (US)

(73) Assignee: The Boeing Company, Chicago, IL (US)

(*) Notice: Subject to any disclaimer, the term of this patent is extended or adjusted under 35 U.S.C. 154(b) by 431 days.

(21) Appl. No.: 13/104,456

(22) Filed: May 10, 2011

(65) Prior Publication Data

US 2012/0286523 A1 Nov. 15, 2012

(51) Int. Cl.
*H02K 23/16* (2006.01)
*H02K 23/66* (2006.01)
*H02K 7/18* (2006.01)

(52) U.S. Cl.
USPC ............... 310/68 R; 310/179; 310/180

(58) Field of Classification Search
USPC ......... 310/179, 180, 184, 185, 188, 195, 208, 310/68 R; 318/497, 526; 290/40 A, 40 C
IPC .................. H02K 7/18,23/16, 23/66
See application file for complete search history.

(56) References Cited

U.S. PATENT DOCUMENTS

| | | | |
|---|---|---|---|
| 4,446,416 A | 5/1984 | Wanlass | |
| 4,937,513 A | 6/1990 | Hoemann et al. | |
| 5,159,255 A | 10/1992 | Weber | |
| 5,175,396 A * | 12/1992 | Emery et al. ........... | 174/36 |
| 5,227,710 A | 7/1993 | Lewus | |
| 5,442,250 A | 8/1995 | Stridsberg | |
| 6,255,755 B1 | 7/2001 | Fei | |
| 6,493,924 B2 | 12/2002 | Das | |
| 6,794,777 B1 * | 9/2004 | Fradella ................. | 310/74 |
| 6,853,107 B2 | 2/2005 | Pyntikov et al. | |
| 7,633,202 B2 | 12/2009 | Hull | |
| 2008/0012538 A1 * | 1/2008 | Stewart et al. ............ | 322/89 |
| 2008/0099626 A1 * | 5/2008 | Bialke .................. | 244/165 |
| 2008/0116759 A1 | 5/2008 | Lin | |
| 2008/0272664 A1 * | 11/2008 | Flynn ................. | 310/154.01 |

FOREIGN PATENT DOCUMENTS

EP 2400656 A2 12/2011

OTHER PUBLICATIONS

Great Britain Search and Examination Report, Dated Sep. 12, 2012, UK Intellectual Property Office, Application No. GB1208075.0, 6 pgs.

Strasik et al., Design, Fabrication, and Test of a 5-kWh/100-kW Flywheel Energy Storage Utilizing a High-Temperature Superconducting Bearing, IEEE Transactions on Applied Superconductivity, vol. 17, No. 2, Jun. 2007, (5 pgs).

Strasik et al., An overview of Boeing flywheel energy storage systems with high-temperature superconducting bearings, Superconductor Science and Technology 23, Feb. 2010, (5 pgs).

* cited by examiner

*Primary Examiner* — Michael Andrews
(74) *Attorney, Agent, or Firm* — Toler Law Group, PC

(57) ABSTRACT

A device includes a rotor and a stator with coils arranged to form a phase element. The phase element includes a first coil group including a first coil and a second coil and a second coil group including a third coil and a fourth coil, where the rotor is positioned between the first coil group and the second coil group. The device also includes one or more switches that enable reconfiguration of the phase element by switching an electrical configuration of the coils. In a first mode, the coils are arranged with the first coil in a first coil path and the second coil in a second coil path that is coupled in parallel with the first coil path. The coils are arranged such that a voltage generated across the first coil path is substantially equal to a voltage generated across the second coil path.

20 Claims, 7 Drawing Sheets

STATORS WITH RECONFIGURABLE COIL PATHS

STATEMENT OF GOVERNMENT RIGHTS

This invention was made with government support under contract number DE-AR0000153 awarded by the U.S. Dept. of Energy, ARPA-E. The government has certain rights in the invention.

FIELD OF THE DISCLOSURE

The present disclosure is generally related to reconfigurable stators.

BACKGROUND

Many generators, such as those used by electric utilities, operate at almost constant speed. However, some generators are driven by variable speed sources, such as an engine of an aircraft or a flywheel energy storage device. The rotational speed of these variable speed sources can vary significantly during operation. Output voltage of a generator may be proportional to the rotational speed of a rotor of the generator. When the rotational speed of the rotor is too low, the output voltage of the generator may be too low to provide sufficient power to a load. Complicated gear assemblies may be used to interface between a variable speed source and the generator in order to keep the rotational speed of the rotor high enough to generate usable power. However, these gear assemblies may be expensive, complex, and heavy. Heavy gear assemblies may be of particular concern when the generator is part of a portable system or aircraft, where weight of the system can be an important design consideration.

SUMMARY

A power electronics unit coupled to a generator may be operable to supply power to a load when a voltage output of the generator satisfies a voltage threshold of the power electronics unit. In a particular embodiment, a stator of the generator may be reconfigurable such that the output of the generator satisfies the voltage threshold of the power electronics unit over a large range of operating speeds of the generator. The stator may be reconfigured by using switches to change how the coils of the stator are wired together. The reconfiguration of the coils may keep the output voltage of the generator within a specified voltage range as the rotational speed of the generator changes.

In a particular embodiment, a device includes power connectors, a rotor including at least one magnet, and a stator having multiple coils arranged to form a first phase element. The first phase element may include a first coil group with at least a first coil and a second coil and a second coil group with at least a third coil and a fourth coil. The rotor may be positioned between the first coil group and the second coil group. The device may also include one or more switches that enable reconfiguration of the first phase element between multiple modes by switching an electrical configuration of the multiple coils. In a first mode of the multiple modes, the multiple coils are arranged with the first coil in a first coil path and the second coil in a second coil path, where the second coil path is coupled to the power connectors in parallel with the first coil path. The multiple coils may be arranged such that a first voltage generated across the first coil path due to relative motion of the rotor and the stator is substantially equal to a second voltage generated across the second coil path due to the relative motion.

In a particular embodiment, a method includes switching electrical configuration of coils of a first phase element of a stator to a first configuration. In the first configuration, a first coil of the first phase element is in a first coil path and a second coil of the first phase element is in a second coil path that is coupled to power connectors in parallel to the first coil path. The method may also include switching the electrical configuration of coils of the first phase element to a second configuration. In the second configuration, the first coil and the second coil are coupled in series. The first phase element may include a first coil group with at least the first coil and the second coil and a second coil group with at least a third coil and a fourth coil. The rotor may be positioned between the first coil group and the second coil group.

In a particular embodiment, a system includes a conversion device configured to convert between kinetic energy and electricity. The conversion device may include power connectors to receive or output the electricity. The conversion device may also include a rotor with at least one magnet and a stator with multiple coils arranged to form at least one phase element. A first phase element may include a first coil group with at least a first coil and a second coil and a second coil group with at least a third coil and a fourth coil. The rotor may be positioned between the first coil group and the second coil group. The conversion device may also include one or more switches that enable reconfiguration of the first phase element between multiple modes by switching an electrical configuration of the multiple coils. In at least one mode of the multiple modes, the multiple coils are arranged with the first coil in a first coil path and the second coil in a second coil path that is coupled to the power connectors in parallel with the first coil path. The multiple coils may be arranged such that a first voltage generated across the first coil path due to relative motion of the rotor and the stator is substantially equal to a second voltage generated across the second coil path due to the relative motion. The system may also include a mechanical device coupled to the rotor and configured to provide kinetic energy to drive the relative motion of the rotor and the stator.

The disclosed embodiments may enable reconfiguration of coils of a stator of a conversion device, such as a generator or a motor. The coils may be reconfigured such that when the conversion device is operated as a generator, output of the conversion device satisfies a threshold of a power electronics unit over a larger range of operating speeds than would be supported if the coils were not reconfigured. The reconfiguration may be performed in a manner that reduces back currents between phase elements of the stator and that enables the conversion device to operate in a higher efficiency configuration for as long as possible before reconfiguring the coils to enable continued operation in a lower efficiency configuration.

The features, functions, and advantages that have been described can be achieved independently in various embodiments or may be combined in yet other embodiments, further details of which are disclosed with reference to the following description and drawings.

DETAILED DESCRIPTION

Figure 1:
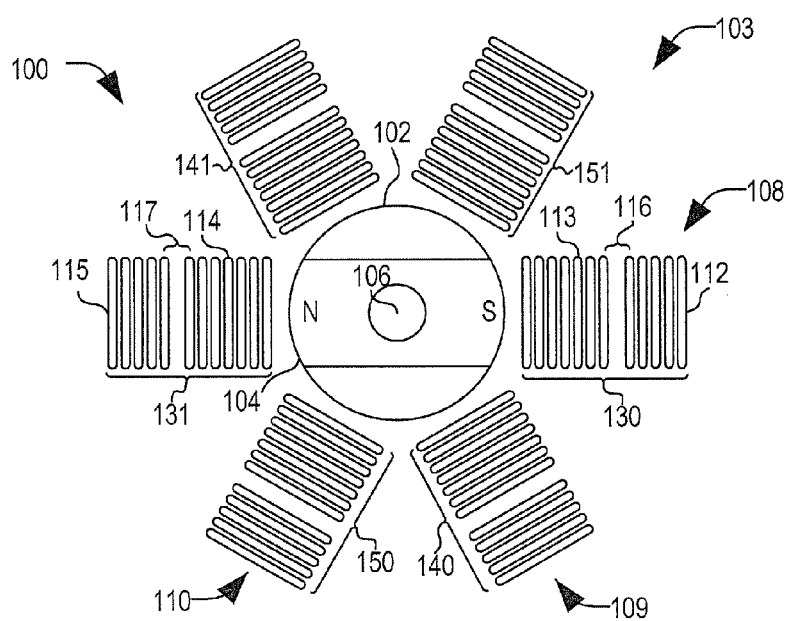
FIG. 1 is an illustration of a top view of a particular embodiment of a portion of a conversion device that includes a rotor and a stator.

Energy conversion devices may convert between kinetic energy and electrical energy. For example, a motor may convert electricity into kinetic energy (i.e., motion). Conversely, a generator may convert motion into electrical energy. For convenience only, and not as a limitation, examples of motion described in this disclosure include rotational motion. However, in certain embodiments, the motion may be linear or in another direction.

In an illustrative embodiment, a rotor of a generator produces a magnetic field that sweeps through one or more stator coils as the rotor turns about an axis of rotation. This rotation causes a magnetic field presented to the stator coils to change, which produces a voltage in the stator coils that enables the stator coils to deliver current to an external circuit. A magnitude of the voltage produced in the stator coils is related to, among other things, a rate of relative motion of the rotor and the stator coils (e.g., a rotational speed of the rotor).

In particular embodiments, the generator may be coupled to a mechanical device that causes the rotational speed of the rotor to change over time. For example, when the generator is coupled to a variable speed engine, such as an engine of an aircraft, a rotational speed of the engine (and a corresponding rotational speed of the rotor) may vary during the course of operation of the aircraft. To illustrate, the aircraft engine may have a different rotational speed during takeoff than while cruising. In another example, a rotational speed of a flywheel of a flywheel energy storage system may vary over time as kinetic energy is added to or removed from the flywheel energy storage system. Thus, when a generator is coupled to a flywheel energy storage system, the rotational speed of the rotor of the generator may vary over time.

In certain aircraft electrical systems, the generator is powered by jet engines of the aircraft. The jet engines may undergo a dramatic change in power (and rotational speed) from takeoff to cruising operations. To keep the rotational speed of the generator within the tolerable range of the power electronics unit, the generator may be connected to a gearbox. The gearbox may be configured to keep the rotational speed of the generator relatively constant over a range of rotational speeds of the jet engine. The gearbox may add significant weight, expense and complexity to the aircraft.

Energy output of a generator may be provided to a power electronics unit. The power electronics unit can provide energy to a load when the voltage produced by the generator falls within a particular range. For generators that have stator coils with a fixed magnetomotive force on the rotor (e.g., a permanent-magnet brushless configuration) and a static coil configuration of the stator, the magnitude of the voltage produced by the generator is proportional to the rotational speed of the rotor. The power electronics unit may be configured such that a maximum voltage that the power electronics unit can tolerate corresponds to a maximum rotational speed of the generator. When the rotational speed of the generator falls below a threshold value that corresponds to a minimum voltage that the power electronics unit can use to deliver electrical power to the load, the power electronics unit may no longer deliver power to the load. At a particular rotational speed and for a particular magnetic flux through a stator coil, the magnitude of the voltage produced in the stator coil is proportional to a number of turns in the stator coil. Thus, by increasing the number of turns in the stator coil at low speeds, the magnitude of the voltage produced by the generator may be maintained above the threshold value of the power electronics unit at the low speeds.

There is typically a minimum rotational speed of a flywheel at which energy can be delivered to a load via the power electronics unit as a result of a drop in voltage as the flywheel rotational speed decreases. This minimum rotational speed limits the amount of energy that can be extracted from the flywheel to a certain percentage of the flywheels maximum rotational kinetic energy. For example, in a flywheel energy storage system, usable energy (i.e., energy that can be extracted while the voltage is above the threshold value of the power electronics unit) may be extracted over a range of speeds of the flywheel from full speed (i.e., a maximum rated speed of the flywheel) to about half speed (i.e., half of the maximum rated speed of the flywheel). Since kinetic energy is proportional to the square of the speed, this range of speeds indicates that only about 75% of the total kinetic energy stored by the flywheel is available for extraction as usable energy.

By increasing the number of turns in the stator coil at low speeds, the magnitude of the voltage produced by the generator may be maintained above the threshold value of the power electronics unit over a larger range of speeds. For example, adding a single reconfiguration in a flywheel storage system may enable the minimum speed at which usable energy can be extracted to be reduced from half the maximum speed of the flywheel to about one-quarter of the maximum speed. Thus, by adding a single reconfiguration in a flywheel storage system the usable energy that can be extracted from the flywheel may be extended to about 94% of the total kinetic stored by the flywheel.

For a constant power output, the resistive heating loss in stator windings increases as the speed of the rotor decreases. From an efficiency point of view and considering the ability to cool the stator, it may be desirable to establish a threshold value at which energy is extracted that is a higher value than what could be obtained using only the power electronics unit voltage threshold value. For example, although reconfiguration of the stator coils may enable extraction of energy from the flywheel down to about 25% of the maximum rotational speed of the flywheel, the threshold value may be set at a higher value, such as about 30% of the maximum rotational speed, about 35% of the maximum rotational speed, about 40% of the maximum rotational speed, or another value between 25% and 50%. It may be desirable to operate in a lowest resistance configuration as long as possible. For example, reconfiguration of the stator from a lower resistance configuration to a higher resistance configuration may be performed at as low a speed as possible (i.e., a lowest speed that still allows the voltage threshold of the power electronics unit to be satisfied). To illustrate, the reconfiguration may be performed just as or just before the voltage generated by the coils matches the voltage threshold value of the power electronics unit (e.g., at about half the maximum speed for a flywheel).

Figure 2:
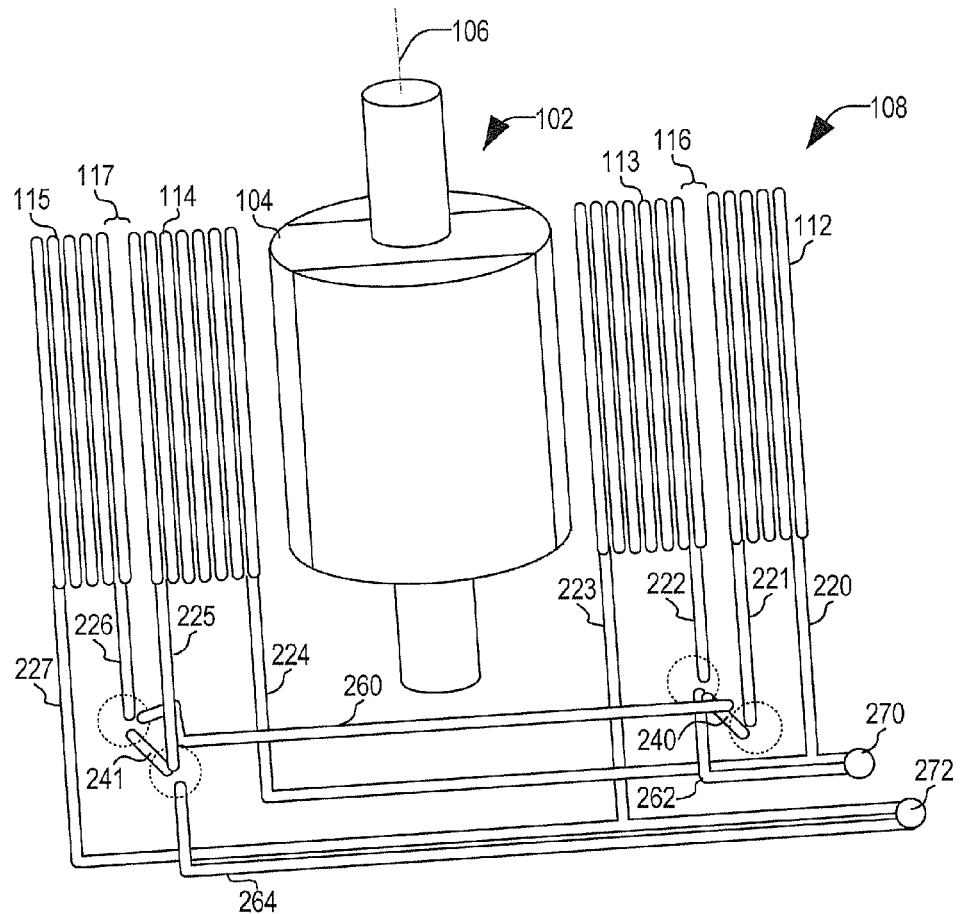
FIG. 2 is an illustration of a second particular embodiment of a portion of a conversion device that includes a rotor and a stator.

FIGS. 1 and 2 are illustrations of a particular embodiment of a conversion device 100 including a rotor 102 and a stator 103. FIG. 1 shows a schematic top view of a portion of the conversion device 100, and FIG. 2 shows a schematic perspective side view of another portion of the conversion device 100 (with portions of the stator 103 omitted to facilitate description of the conversion device 100).

In a particular embodiment, the conversion device 100 is a three-phase generator or a three-phase motor. The stator 103 may include a plurality of coils or windings arranged in phase elements, such as a first phase element 108, a second phase element 109, and a third phase element 110. In other embodiments, the conversion device 100 may have a different number of phases and may have a corresponding different number of phase elements. Also, in certain embodiments, each phase element 108-110 of the stator 103 may include additional sets of coils. For example, in a particular configuration, the rotor 102 includes more than one magnet 104 (or more that two magnetic poles) and each of the phase elements 108-110 includes more than two sets of coils, which are angularly offset from one another around the stator 103. To illustrate, the rotor 102 may include four magnetic poles, and the first phase element 108 may include four sets of coils that are offset from each other by about ninety degrees around the stator 103.

Thus, the conversion device 100 may have various numbers of phases, various numbers of poles of the rotor 102, and various numbers of sets of coils for each phase element 108-110 of the stator 103. Also, the conversion device 100 may be operated as a generator, a motor, or both. For example, power may be applied to the stator 103 to cause rotation of the rotor 102 when the conversion device 100 is operated as a motor. When the conversion device 100 is operated as a generator, the rotor 102 may be turned (e.g., by a mechanical device that is not shown in FIGS. 1 and 2) to generate a voltage across ends of coils of the stator 103. Additionally, for ease of description, the conversion device 100 is illustrated and described as a rotational device (i.e., a device that converts electricity into rotary motion or that converts rotary motion into electricity); however, in certain embodiments, the conversion device 100 may be a linear device, such as a linear motor. Further, the coils of the stator 103 are shown in FIGS. 1 and 2 as having twelve turns each; however, each of the coils may have more than or fewer than twelve turns depending on the specific configuration of the conversation device 100.

Referring to FIG. 1, the rotor 102 may include a shaft that provides an axis 106 of rotation of the rotor 102. The magnet 104 may be a permanent magnet that is magnetized transverse to an axis of symmetry of the magnet 104 so as to have a single north (N) and a single south (S) magnetic pole as indicated in FIG. 1. In operation as a generator, the rotor 102 rotates about the axis 106 of rotation and magnetic flux from the magnet 104 sweeps through coils of the stator 103. During rotation of the rotor 102, the changing magnetic flux produces a voltage across ends of the coils of the stator 103, according to Faraday's law, and the coils of the stator 103 can provide a current to an external circuit (not shown). In particular embodiments, the conversion device 100 may include a ferromagnetic back-iron (not shown), ferromagnetic teeth (not shown), or both.

In a particular embodiment, each of the phase elements 108-110 of the stator 103 includes multiple sets of coils. For example, the first phase element 108 may include a first coil group 130 that includes at least a first coil 112 and a second coil 113. The first phase element 108 may also include a second coil group 131 that includes at least a third coil 114 and a fourth coil 115. Similarly, the second phase element 109 may include a third coil group 140 and a fourth coil group 141, and the third phase element 110 may include a fifth coil group 150 and a sixth coil group 151. The rotor 102 may be positioned between coil groups of a particular phase element. For example, the rotor 102 may be positioned between the first coil group 130 and the second coil group 131 of the first phase element 108.

Each of the coil groups 130, 131, 140, 141, 150, 151 may include multiple coils. For example, the first coil group 130 may include the first coil 112 and the second coil 113, and the second coil group 131 may include the third coil 114 and the fourth coil 115. One or more switches may enable reconfiguration of the coils of each of the phase elements 108-110. For example, referring to FIG. 2, switches 240 and 241 may enable reconfiguration of the first phase element 108 between multiple modes by switching an electrical configuration of the coils 112-115. To illustrate, in a first mode, the coils 112-115 may be arranged with the first coil 112 in a first coil path and the second coil 113 in a second coil path, where the second coil path is coupled to power connectors 270, 272 in parallel with the first coil path. For example, the first coil 112 may include ends 220 and 221, the second coil 113 may include ends 222 and 223, the third coil may include ends 224 and 225 and the fourth coil 115 may include ends 226 and 227. A first power connector 270 may be coupled to the end 220 of the first coil 112, to the end 224 of the third coil 114 and to the first switch 240. A second power connector 272 may be coupled to the end 223 of the second coil 113, to the end 227 of the fourth coil 115 and to the second switch 241. By changing a position of the first switch 240 and the second switch 241, various electrical configurations of the coils 112-115 relative to one another and to the power connectors 270, 272 can be achieved.

Figure 3:
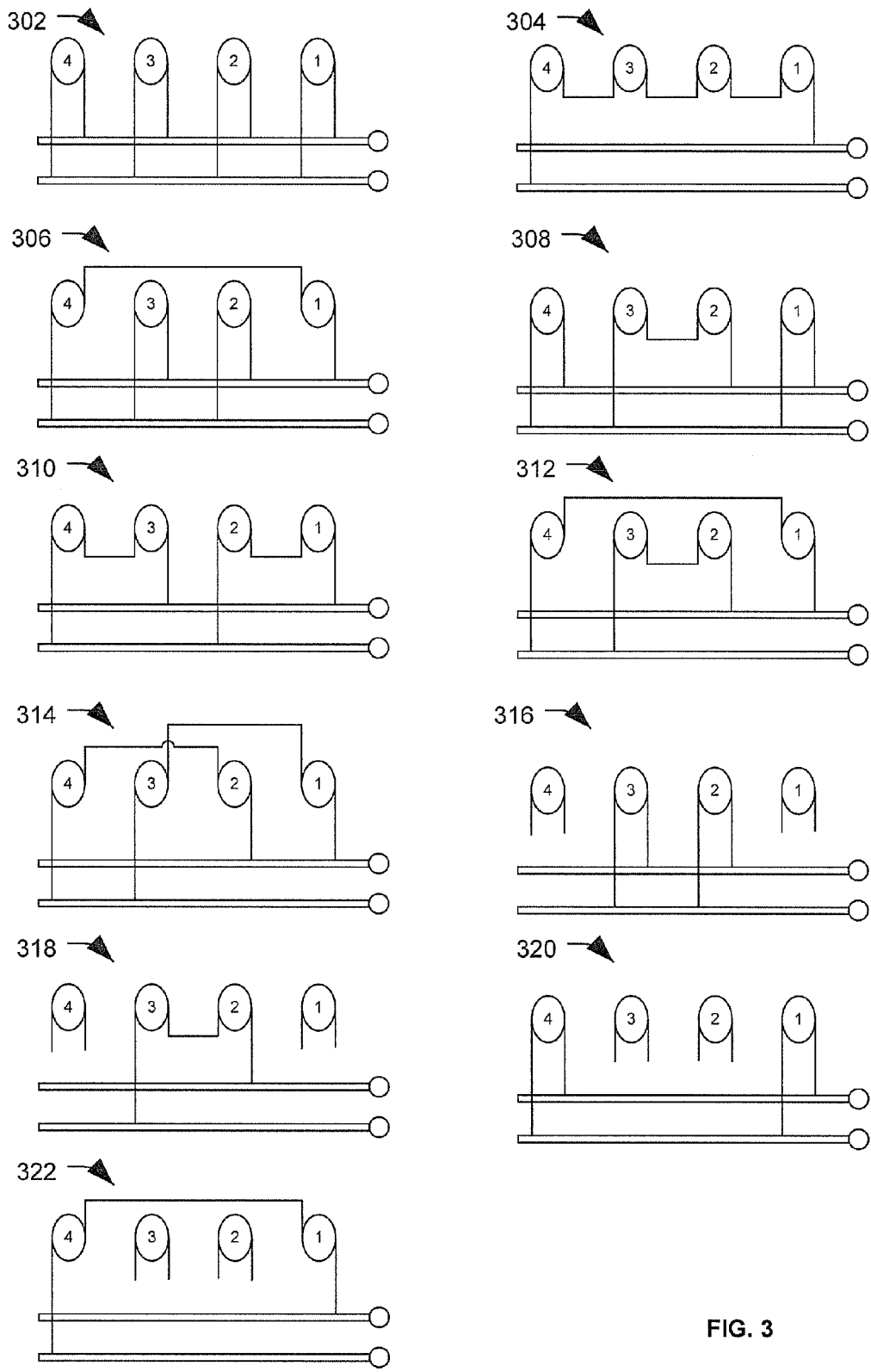
FIG. 3 is a stylized, simplified diagram of particular embodiments of a phase element in various electrical configurations.

For example, FIG. 3 shows a stylized, simplified diagram of a phase element, such as one of the phase elements 108-110 of FIG. 1, in various electrical configurations. In a first electrical configuration 302, each of the coils of the phase element is coupled to power connectors in parallel to each other coil of the phase element. In a second electrical configuration 304, the coils of the phase element are coupled to the power connectors in series. In a third electrical configuration 306, the first and fourth coils are coupled together in series to form a set of coils. The second coil, the third coil, and the set of coils (which includes the first coil and the fourth coil) are coupled to the power connectors in parallel to one other.

In a fourth electrical configuration 308, the second and third coils are coupled together in series to form a set of coils. The first coil, the fourth coil, and the set of coils (which includes the second coil and the third coil) are coupled to the power connectors in parallel to one other. In a fifth electrical configuration 310, the first and second coils are coupled together in series to form a first set of coils, and the third and fourth coils are coupled together in series to form a second set of coils. The first set of coils and the second set of coils are coupled to the power connectors in parallel to one other.

In a sixth electrical configuration 312, the first and fourth coils are coupled together in series to form a first set of coils, and the second and third coils are coupled together in series to form a second set of coils. The first set of coils and the second set of coils are coupled to the power connectors in parallel to one other. In a seventh electrical configuration 314, the first and third coils are coupled together in series to form a first set of coils, and the second and fourth coils are coupled together in series to form a second set of coils. The first set of coils and the second set of coils are coupled to the power connectors in parallel to one other.

In certain electrical configurations, one or more of the coils may not be coupled to the power connectors. For example, in an eighth electrical configuration 316, the second and third coils are coupled to the power connectors in parallel to one other and the first and fourth coils are not coupled to the power connectors. In another example, in a ninth electrical configuration 318, the second and third coils are coupled in series to the power connectors and the first and fourth coils are not coupled to the power connectors. In another example, in an tenth electrical configuration 320, the first and fourth coils are coupled to the power connectors in parallel to one other and the second and third coils are not coupled to the power connectors. In still another example, in an eleventh electrical configuration 322, the first and fourth coils are coupled in series to power connectors and the second and third coils are not coupled to the power connectors.

Returning to FIG. 2, the switches 240, 241 (and possibly one or more additional switches) may be used to configure or reconfigure the coils 112-115 in any of the electrical configurations of FIG. 3. To illustrate, when the first switch 240 couples the end 221 of the first coil 112 to the end 222 of the second coil 113, and the second switch 241 couples the end 225 of the third coil to the end 226 of the fourth coil 115, the coils 112-115 are all connected in series to the power connectors 270, 272. This arrangement corresponds to the second electrical configuration 304 of FIG. 3.

In another illustrative example, when the first switch 240 couples the end 221 of the first coil 112 to a first wire 260 and couples the end 222 of the second coil 113 to a second wire 262 that is coupled to the first power connector 270, and the second switch 241 couples the end 225 of the third coil 114 to a third wire 264 that is coupled to the second power connector 272 and couples the end 226 of the fourth coil 115 to the first wire 260, the coils 112-115 are connected with the second coil 113 and the third coil 114 in parallel with one another, and the first coil 112 and the fourth coil 115 are connected in series with each other and in parallel with second coil 113 and the third coil 114. This arrangement corresponds to the third electrical configuration 306 of FIG. 3.

Voltage output by the coils 112-115 is generally additive when two or more coils are coupled in series. For example, referring to FIG. 3, in the eighth electrical configuration 316, the second coil and the third coil are coupled in parallel, and in the ninth electrical configuration 318, the second coil and the third coil are coupled in series. Thus, the output voltage of the ninth electrical configuration 318 may be approximately two times the output voltage of the eighth electrical configuration 316. Also, resistance of the coils is generally additive for coils coupled in series and is lower when the coils are coupled in parallel. Thus, to reduce resistance, parallel electrical configurations may be used at higher rotational speeds (to reduce resistive heating) and series electrical configurations may be used at lower rotational speeds (to increase output voltage).

Magnetic flux through the coils 112-115 decreases with distance from the magnet 104. Thus, magnetic flux through the first coil 112 may be less than magnetic flux through the second coil 113, since the first coil 112 is further from the magnet 104 than that second coil 113. Likewise, magnetic flux through the fourth coil 115 may be less than magnetic flux through the third coil 114, since the fourth coil 115 is further from the magnet 104 than that third coil 114. A gap, such as a first gap 116 and a second gap 117, may be defined between adjacent coils. For example, the first coil 112 may be radially spaced a distance from the second coil 113 to define the first gap 116, and the third coil 114 may be radially spaced a distance from the fourth coil 115 to define the second gap 117. The gaps 116-117 may be adjustable (either during use of the conversion device 100 or as part of a tuning process that is performed while the conversion device 100 is not in use) to adjust the magnetic flux experienced by each coil 112-115. In particular, the gaps 116-117 may be adjusted to balance voltage across the coils 112-115 or across particular sets of the coils 112-115 in particular electrical configurations. Balancing the voltage across the coils 112-115 or the sets of coils 112-115 may reduce unintended current flow (such as back flow) through the coils 112-115. To illustrate, the gaps 116-117 may be adjusted such that, in the third electrical configuration 306 of FIG. 3, the voltage across the second coil, the voltage across the third coil and the voltage across the series coil path that includes the first coil and the fourth coils are balanced. That is, a first voltage that is generated across a first coil path (that includes the first coil and the fourth coil) due to relative motion of the rotor and the stator is substantially equal to a second voltage generated across a second coil path (that includes the second coil) due to the relative motion and is substantially equal to a third voltage generated across a third coil path (that includes the third coil) due to the relative motion.

As illustrated by the eighth, ninth, tenth and eleventh electrical configurations 316-322 of FIG. 3, certain electrical configurations of the stator may utilize only some of the coils. For example, by switching from the first electrical configuration 302 to the eighth electrical configuration 316, a total number of turns of the coils that are used is reduced. Such switching may be referred to as "turn shedding". Conversely, by switching from the eighth electrical configuration 316 to the first electrical configuration 302, additional turns are effectively added to the coils. More turns may generate higher output voltage than fewer turns; however, more turns may also have higher resistance. Accordingly, when turn shedding is used, higher turn count electrical configurations may be used at lower rotational speeds and lower turn count electrical configurations may be used at higher rotational speeds.

As shown in FIG. 3, the stator may be reconfigured by switching between series and parallel configurations. The second electrical configuration 304, the ninth electrical configuration 318 and the eleventh electrical configuration 322 are examples of series configurations. The first electrical configuration 302, the eighth electrical configuration 316 and the tenth electrical configuration 320 are examples of parallel configurations. The stator may also be reconfigured to or from a hybrid configuration in which some coils are connected in series and other are connected in parallel. The third, fourth, fifth, sixth, and seventh electrical configurations 306-314 are examples of hybrid configurations. Additionally, the stator may be reconfigured to add or remove turns, e.g., turn shedding or turn adding. Further, turn shedding and series-parallel reconfigurations may be performed independently or concurrently. To illustrate, by switching from the second electrical configuration 304 to the eighth electrical configuration 316, the stator is reconfigured from a series configuration to a parallel configuration and a total number of turns of the coils that is used is reduced.

At higher rotational speeds, coil resistance may be decreased, which may improve efficiency. Generally, resistance decreases more and efficiency is improved by switching between series, parallel and hybrid configurations rather than by turn shedding. As an enhancement of a turn-shedding embodiment, a number of reconfigurations that can be selected can be increased by further subdividing each coil and adding switches. For example, referring to FIG. 2, the first coil 112 and the fourth coil 115 each include 5 turns and the second coil 113 and the third coil 114 each include 7 turns. Thus, when all of the coils 112-115 are used, the first phase element 108 includes 12 turns (7+5) on each side. When turns are shed, for example, by switching the switches 240, 241 such that the first coil 112 and the fourth coil 115 are unused, the first phase element 108 has 7 turns on each side. By adding additional switches, the number of turns used may have additional choices. To illustrate, by adding a switch associated with each turn, the number of turns may be selected from one turn per side up to twelve turns per side, depending on which of the turns are used. Adding switches may also increase the number of hybrid configurations that may be selected.

In a particular embodiment, the stator 103 may be configured to be switched between a series configuration (e.g., the second electrical configuration 304 of FIG. 3) and a hybrid configuration in which the first coil 112 and the fourth coil 115 are in series with one another and in parallel with the second coil 113 and the third coil 114 (e.g., the third electrical configuration 306 of FIG. 3). In the series configuration, there is only a single coil path including twelve turns per side of the first phase element (although more or fewer turns could be used). Thus, the series configuration in the embodiment illustrated in FIG. 2 may be referred to as a 12-12 configuration. A voltage across the single coil path in the 12-12 configuration is approximately a sum of the voltages across each coil individually (e.g., about four times the voltage across a single one of the coils 112-115).

In the hybrid configuration, there are three coil paths, a first coil path that includes the first coil 112 and the fourth coil 115 in series, a second coil path that includes only the second coil 113, and a third coil path that includes only the third coil 114. In the embodiment illustrated in FIG. 2, the first coil path has 10 turns, the second coil path has 7 turns and the third coil path has 7 turns. Thus, the hybrid configuration may be referred to as a 7-7-10 configuration.

In a particular embodiment, the gaps 116-117 may be adjusted such that the voltage across the first coil path is substantially equal to the voltage across the second and third coil paths. For example, a distance across each gap 116-117 may be adjusted in response to switching the configuration of the first phase element 108. In another example, the distance across each gap 116-117 may be fixed and may be pre-adjusted (e.g., using shims, spacers, positioning bolts, etc.) to a distance that causes the voltage across the first coil 112 to be approximately one half the voltage across the second coil 113. When the gaps 116 and 117 are adjustable during use of the conversion device 100, the first coil 112 and the fourth coil 115 may be coupled to a linear motor or other movable element that enables precise repositioning of the coils 112 and 115 to adjust the distance across the gaps 116 and 117. Voltage across the coil paths can be equalized even though the number of turns is different since the magnetic flux from the rotor 102 decreases with radial distance from a magnetic field source.

In a particular embodiment, the distance across the gaps 116 and 117 may be pre-adjusted and fixed using shims and positioning bolts when the stator 103 is made. For example, the rotor 102 may be rotated at a test speed, and voltage measurements across the coils 112-115 may be taken. A thickness of shims in the gaps 116 and 117 may be changed until a desired relationship of the voltage measurements is obtained. The coils 112-115 of the stator 103 may be potted in place, e.g., using epoxy or another material. Alternatively, to enable dynamic adjustment of the gaps 116-117, the coils 112-115 may be wound on a coil former and the coil former may be attached to a linear motor with actuation in the radial direction. Dynamic adjustment of the gaps 116-117 may be desirable when the rotor 102, the stator 103, or both, change size during use, e.g., as a result of rotary motion or a change in temperature. In this case, the linear motor may also enable adjusting distances between each of the coils 112-115 and the rotor 102 to account for changes in magnetic flux distribution. When the stator 103 includes stator teeth (not shown), magnetic flux through each of the coils 112-115 may be approximately the same, and radial adjustment of the coils 112-115 may not be needed.

Figure 4:
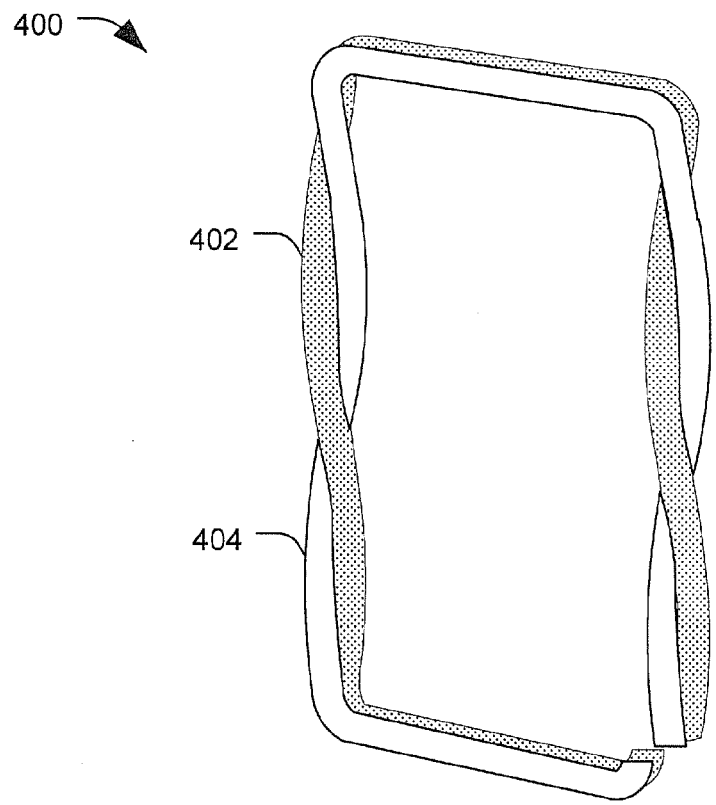
FIG. 4 is an illustration of a particular embodiment of a bifilar coil.

In a particular embodiment, the coils may be arranged such that magnetic flux through each coil is approximately the same. For example, the first coil 112 and the second coil 113 may be intertwined in a bifilar coil arrangement. FIG. 4 is an illustration of a particular embodiment of a bifilar coil 400. The bifilar coil 400 includes a first wire 402 that is arranged to form one turn of a coil. A second wire 404 is intertwined with the first wire 402 such that the second wire 404 forms one turn of a second coil. The bifilar coil 400 may be used to form interleaved coils of a stator.

Figure 5:
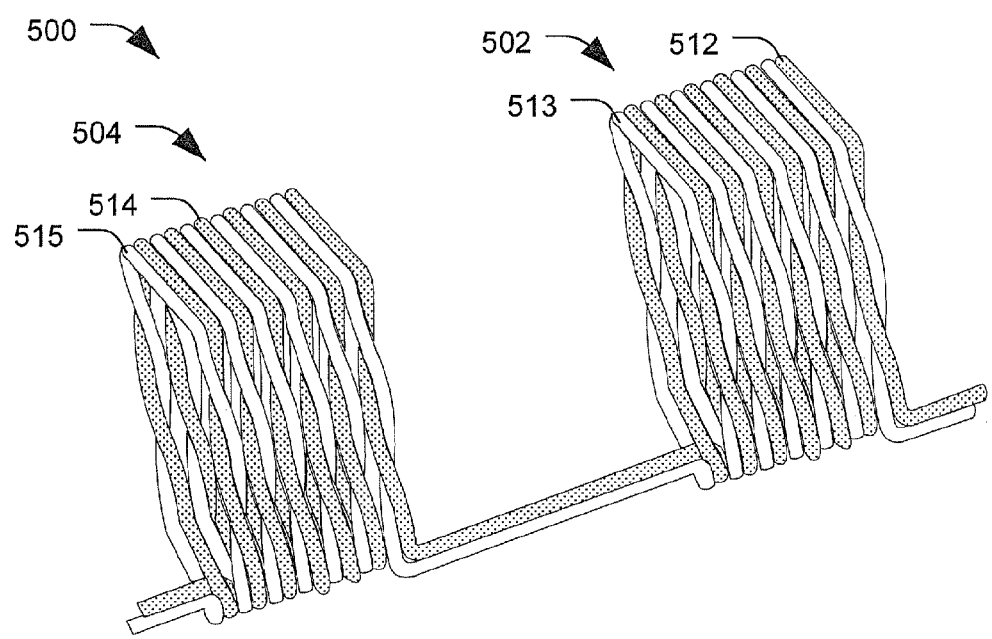
FIG. 5 is an illustration of a particular embodiment of a phase element of a stator.

FIG. 5 is an illustration of a particular embodiment of a phase element 500 of a stator. The phase element 500 is formed using bifilar coils. For example, a first side 502 of the phase element 500 includes a first coil 512 intertwined with a second coil 513 in a bifilar arrangement. A second side 504 of the phase element 500 includes a third coil 514 intertwined with a fourth coil 515 in a bifilar arrangement. In the embodiment illustrated in FIG. 5, magnetic flux through the first coil 512 and through the second coil 513 is approximately equal. Accordingly, regardless of which of the coils 512-515 are used and whether the coils 512-515 are coupled in a series configuration, a parallel configuration or a hybrid configuration, voltage across each of the coils 512-515 will be approximately equal and gaps (such as gaps 116 and 117) are not needed to balance the voltage in some configurations.

Figure 6:
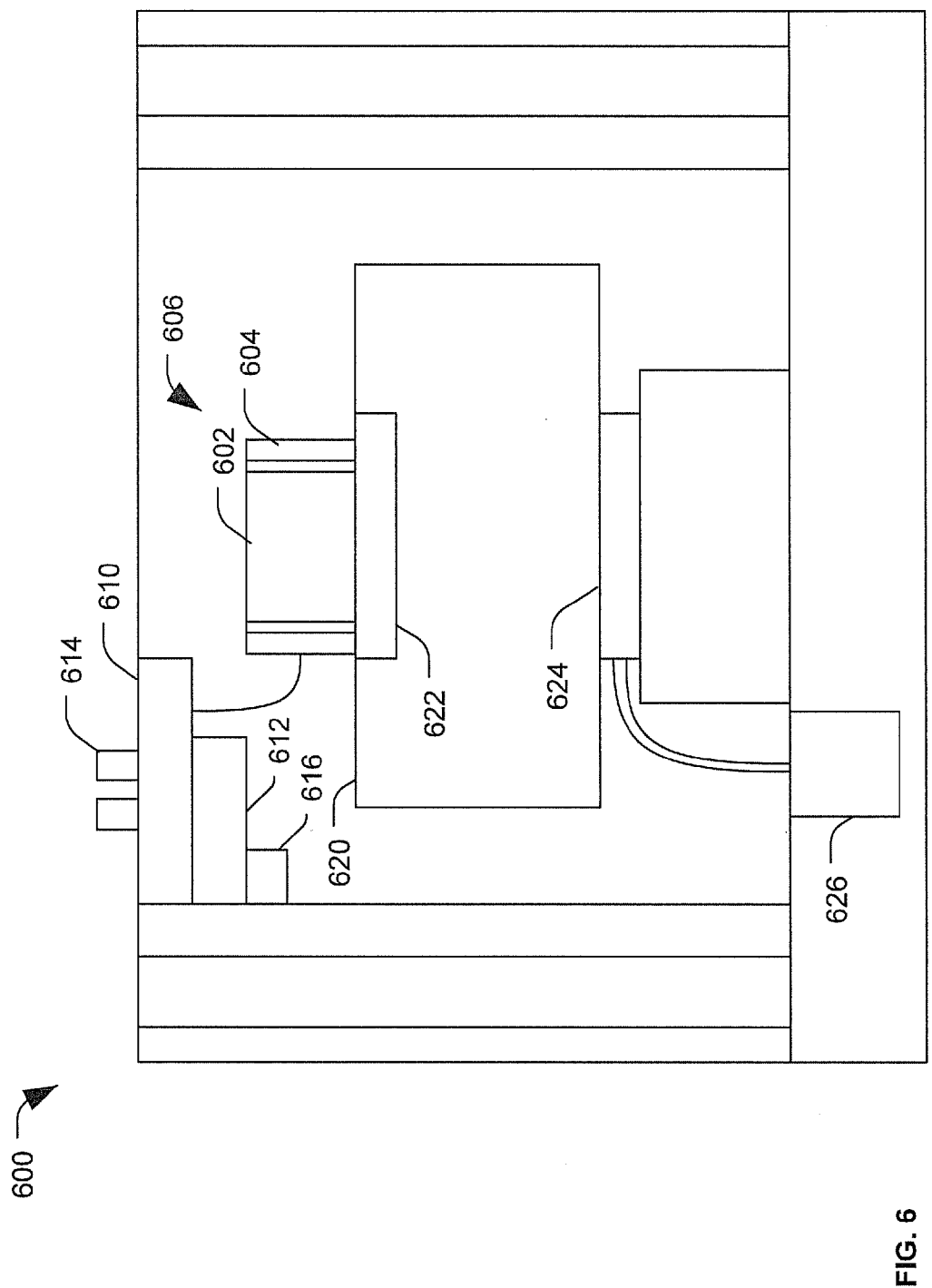
FIG. 6 is a diagram of a particular embodiment of a system including an conversion device and a mechanical device.

FIG. 6 is a diagram of a particular embodiment of a system 600 that includes a conversion device 606 and a mechanical device 620. In the particular embodiment illustrated in FIG. 6, the mechanical device 620 is a flywheel and the system 600 is a flywheel energy storage system; however, in other embodiments the mechanical device 620 may be another variable speed device, such as a jet engine. The system 600 may include a power connectors 614 to receive electricity from a separate power source (not shown), to output electricity to a separate load (not shown), or both.

The conversion device 606 may include or be included within the conversion device 100 of FIGS. 1 and 2. The conversion device 606 may be configured to convert between kinetic energy and electricity. The conversion device 606 may include a rotor 602 including at least one magnet. The conversion device may also include a stator 604. The stator 604 may include multiple coils arranged to form one or more phase elements, such as the phase elements 108, 109 and 110 of FIG. 1. A first phase element of the stator 604 may include a first coil group that includes at least a first coil and a second coil, and a second coil group that includes at least a third coil and a fourth coil. The rotor 602 may be positioned between the first coil group and the second coil group. For example, the first phase element may include one of the phase elements 108-110 of FIG. 1, the first phase element 108 of FIG. 2, or the phase element 500 of FIG. 5.

The system 600 may also include one or more switches 610 that enable reconfiguration of the first phase element (or other phase elements) between multiple modes by switching an electrical configuration of the multiple coils. To illustrate, the switches 610 may enable reconfiguration of the phase elements of the stator 604 between the electrical configurations 302-322 of FIG. 3. For example, in at least one mode of the multiple modes, the multiple coils are arranged with the first coil in a first coil path and the second coil in a second coil path that is coupled to the power connectors 614 in parallel with the first coil path (such as in the third electrical configuration 306 of FIG. 3). The coils of the stator 604 may be arranged such that a first voltage generated across the first coil path due to relative motion of the rotor 602 and the stator 604 is substantially equal to a second voltage generated across the second coil path due to the relative motion. For example, the coils may be bifilar coils (as described with reference to FIGS. 4 and 5). In another example, a gap may be defined between the first and the second coil and the distance across the gap may be selected to balance the voltage across the coil paths (as described with reference to FIG. 2).

The system 600 may also include or be coupled to a controller 612. In a particular embodiment, the controller 612 includes a processor that executes software (e.g., from a memory device) to control various functions of the system 600. In another particular embodiment, the controller 612 includes one or more application specific integrated circuits that are operable to control various functions of the system 600. In yet another embodiment, the controller 612 includes a processor that executes software and application specific integrated circuits that together control functions of the system 600.

The controller 612 may be configured to select a particular mode in which the conversion device 606 is to operate at a particular time. For example, the controller 612 may include or may be coupled to a sensor 616. The sensor 616 may sense a parameter associated with the system 600, and the controller 612 may select the particular mode in which the conversion device 606 is to operate based on a value of the sensed parameter. To illustrate, the controller 612 may select a particular mode based at least partially on a rate of the relative motion of the rotor 602 and the stator 604. In another example, the controller 612 may select the particular mode based on a voltage measured across one or more of the coils of the stator 604. To illustrate, the controller 612 may select the mode in order to satisfy a threshold associated with a power electronics unit (not shown in FIG. 6).

The mechanical device 620 may be coupled to the rotor 602 and may be configured to provide kinetic energy to drive the relative motion of the rotor 602 and the stator 604 (e.g., via a mechanical linkage coupling the mechanical device 620 and the rotor 602). In a particular embodiment, the stator 604 may drive motion of the rotor 602 (e.g., via electromotive forces generated by current applied to the stator 604) to turn the mechanical device 620 (e.g., via a mechanical linkage). For example, the mechanical device 620 may include a flywheel. The flywheel may be configured to transfer kinetic energy stored by the flywheel to the rotor 602 to generate electricity and to receive kinetic energy from the rotor 602 in response to electricity received via the power connectors 614.

To switch modes, the controller 612 may be configured to actuate the one or more switches 610 in an order specified by a switching pattern. The order of the switching pattern may be selected to limit unbalanced forces on the rotor 602 due to current flow through the multiple coils. For example, when the mechanical device 620 is a flywheel, the flywheel may turn at a relatively high speed. At such high speeds, unbalanced forces on the rotor 602 may damage the flywheel or supporting elements of the flywheel, such as a carrier bearing 622, a high temperature super conductor bearing 624, a cryogenic cooling system 626, or any combination thereof.

Thus, the system 600 may enable reconfiguration of coils of the stator 604 of the conversion device 606, such as a generator or a motor. The coils may be reconfigured such that when the conversion device 606 is operated as a generator, output of the conversion device 606 satisfies a threshold of a power electronics unit over a larger range of operating speeds than would be supported if the coils were not reconfigured. The reconfiguration may be performed in a manner that reduces back currents between phase elements of the stator 604 and that enables the conversion device 606 to operate in a higher efficiency configuration for as long as possible before reconfiguring the coils to enable continued operation in a lower efficiency configuration.

Figure 7:
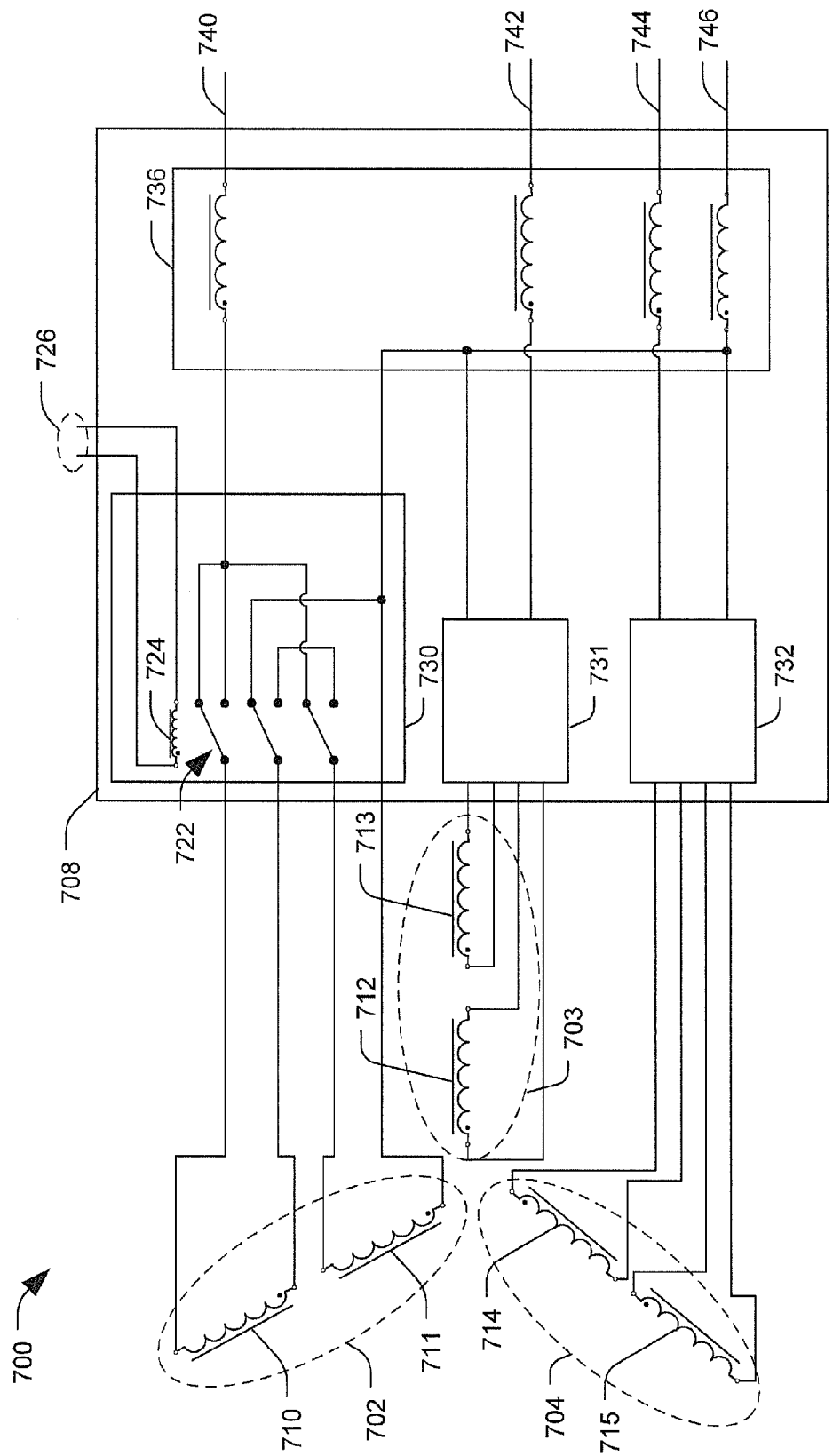
FIG. 7 is schematic circuit diagram of a particular embodiment of a conversion system.

FIG. 7 is a schematic circuit diagram of a particular embodiment of a conversion device 700. The conversion device 700 may include a plurality of coils 710-715 that are arranged into phase elements 702-704. The conversion device 700 may also include a rotor, which is not shown in FIG. 7. In a particular embodiment, the conversion device 700 may include or be included within the conversion device 100 of FIGS. 1 and 2 or the conversion device 606 of FIG. 6. Each of the phase elements 702-704 may include a plurality of coils, which may be separate (as illustrated in FIGS. 1 and 2) or may be intertwined (as illustrated in FIGS. 4 and 5). For example, a first phase element 702 may include a first coil 710 and a second coil 711, a second phase element 703 may include a third coil 712 and a fourth coil 713, and a third phase element 704 may include a fifth coil 714 and a sixth coil 715.

The conversion device 700 may include or be coupled to one or more switches 722 that enable reconfiguration of the coils 710-715. For example, the switches 722 may enable reconfiguration of the coils 710-715 between the electrical configurations 302-322 of FIG. 3. In a particular embodiment, the switches 722 may be located in windings of the stator or near the windings of the stator. The switches 722 may be mechanical, electrical, or electromechanical.

In a particular embodiment, the switches 722 may be housed within reconfiguration housings 730-732 associated with each of the phase elements 702-704. The reconfiguration housings 730-732 may be included within a control housing 708. The control housing 708 may include a control interface 726 that enables remote actuation of the switches 722. For example, the switches 722 may be associated with an actuation device 724, such as a solenoid, that enables actuation of the switches 722 individually or as a group. The switches 722 may be latching switches so that power is only provided to the actuation device 724 for a short time period.

The conversion device 700 may include power outputs, such as a first power output 740 associated with the first phase element 702, a second power output 742 associated with the second phase element 703, a third power output 744 associated with the third phase element 704, and at least one neutral line 746. The conversion device 700 may include or be coupled to power processing components, such as inductors 736.

The coils 710-715 of the conversion device 700 may be reconfigured such that when the conversion device 700 is operated as a generator, output of the conversion device 700 satisfies a threshold of a power electronics unit (not shown in FIG. 7) over a larger range of operating speeds than would be supported if the coils 710-715 were not reconfigured. The reconfiguration may be performed in a manner that reduces back currents between phase elements 702-704 and that enables the conversion device 700 to operate in a higher efficiency configuration for as long as possible before reconfiguring the coils 710-715 to enable continued operation in a lower efficiency configuration.

Figure 8:
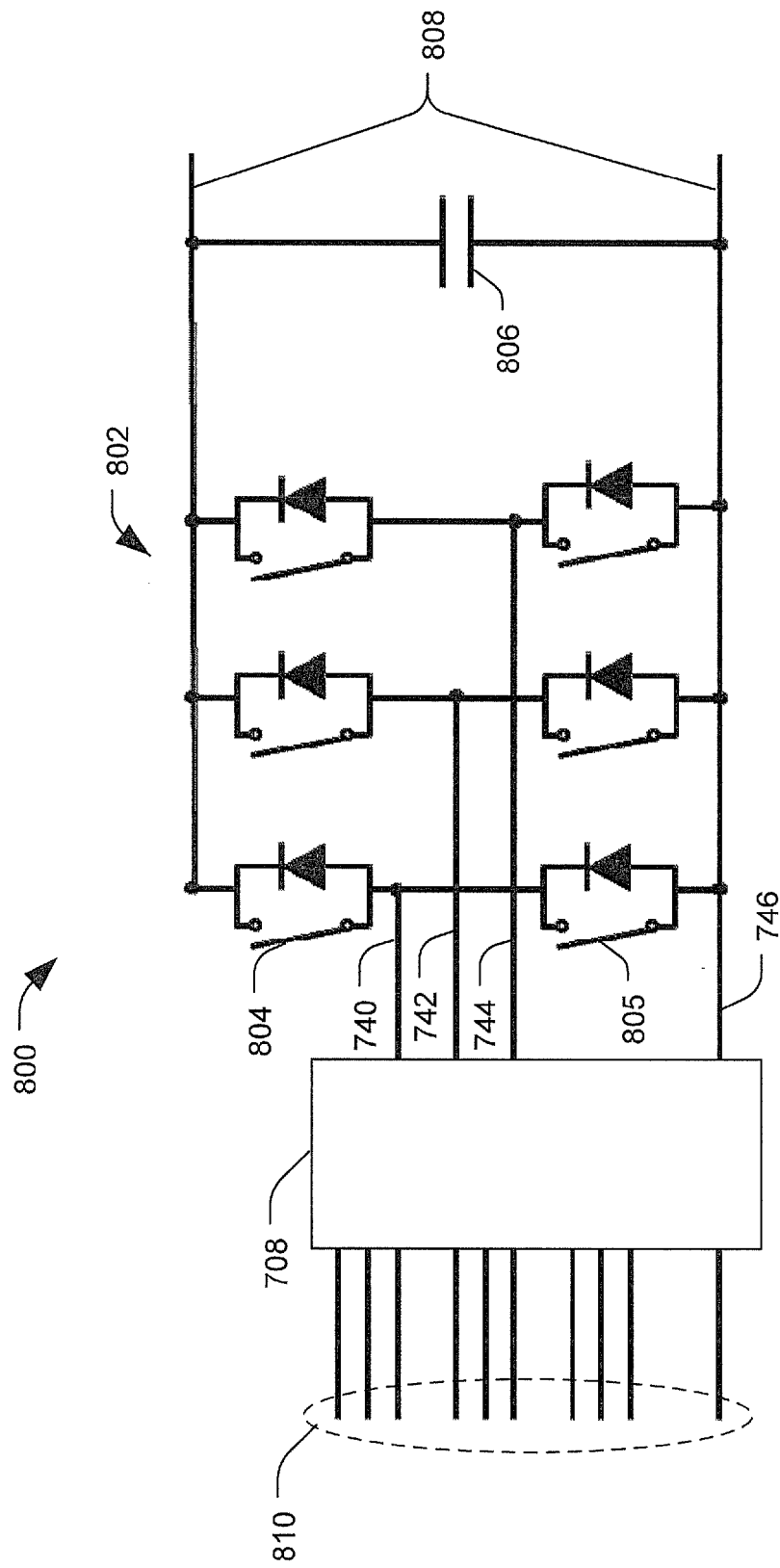
FIG. 8 is schematic circuit diagram of a particular embodiment of a power treatment system for a conversion system.

FIG. 8 is a schematic circuit diagram of a particular embodiment of a power treatment system 800, such as a power electronics unit, for a conversion system. The power treatment system 800 may be coupled to outputs 810 of a plurality of phase elements of a conversion device, such as the conversion device 700 of FIG. 7, via the control housing 708. Power output by the conversion device may be received by the power treatment system 800 via outputs associated with each phase element, such as the first power output 740, the second power output 742, the third power output 744, and the neutral line 746.

In a particular embodiment, the power treatment system 800 may be adapted to change variable frequency, variable-voltage output received from the conversion device via the power outputs 740, 742, 744 and the neutral line 746 to a fixed frequency, fixed-voltage output to be delivered to a load. For example, the power treatment system 800 may include an H-bridge rectifier-inverter. In this example, on a rectifier side 802 of the power treatment system 800, each of the power outputs 740, 742, 744 may be associated with two electrical switches, such as switches 804 and 805, that connect the corresponding power output 740, 742, 744 to a direct current (DC) bus 808. These switches may be IGBT type or another type of semiconductor electrical power switch.

A capacitor 806 may be associated with the DC bus 808. When a reconfiguration is performed in a particular phase, the two switches associated with that particular phase may be turned off (i.e., opened) during the reconfiguration and turned back to a normal operating state (i.e., closed) after the reconfiguration. During the reconfiguration, the rotor of the conversion device (not shown in FIG. 8) may continue to spin causing magnetic flux to sweep across the coils of the stator (not shown in FIG. 8). Thus, the coils may experience a continuous change in voltage. With both switches associated with the particular phase in the off state (i.e., open), the coils of the particular phase are effectively open circuited, and no current will flow in the particular phase during switching to perform the reconfiguration. Opening the switches for a phase that is being reconfigured may reduce occurrence of voltage spikes and current flow within the coils of the particular phase during the reconfiguration. The switches may be controlled in response to a firing sequence program of a controller (such as the controller 612 of FIG. 6). Alternatively, disconnect switches can be placed between the power outputs 740, 742, 744 and the power treatment system 800.

In a particular embodiment, reconfiguration of different phases may be synchronized. For example, switches of the rectifier side 802 may be turned off (i.e., opened) at substantially the same time. That is, when the controller issues a signal indicating that reconfiguration is to be performed, each switch that is closed (i.e., in an "on" state) remains closed during the reconfiguration event. Each switch that is open (i.e., is in an "off" state) remains open until the reconfiguration event is complete. In this example, the capacitor 806 of the DC bus 808 may be sized to have sufficient capacitance to support an output load of the conversion device for the several cycles of output during which reconfiguration occurs.

In another example, each phase may be reconfigured sequentially. To illustrate, in a three-phase stator, at least two generator phases may remain in operation at all times during the reconfiguration to support the DC bus 808. In this example, when the second phase is being reconfigured, the first phase will be at a different voltage than the third phase, and the capacitor 806 may be sized to have sufficient capacitance to prevent a significant amount of back current of the higher voltage phase from flowing to the lower voltage phase.

Accordingly, the power treatment system 800 enables treatment of power received from a conversion device to power the DC bus 808 and to supply power to a load (not shown). The switches of the power treatment system 800 enable reconfiguration of coils of the stator without allowing voltage imbalances between phases of the stator to cause undesired current flow, e.g., from a higher voltage phase to a lower voltage phase.

Figure 9:
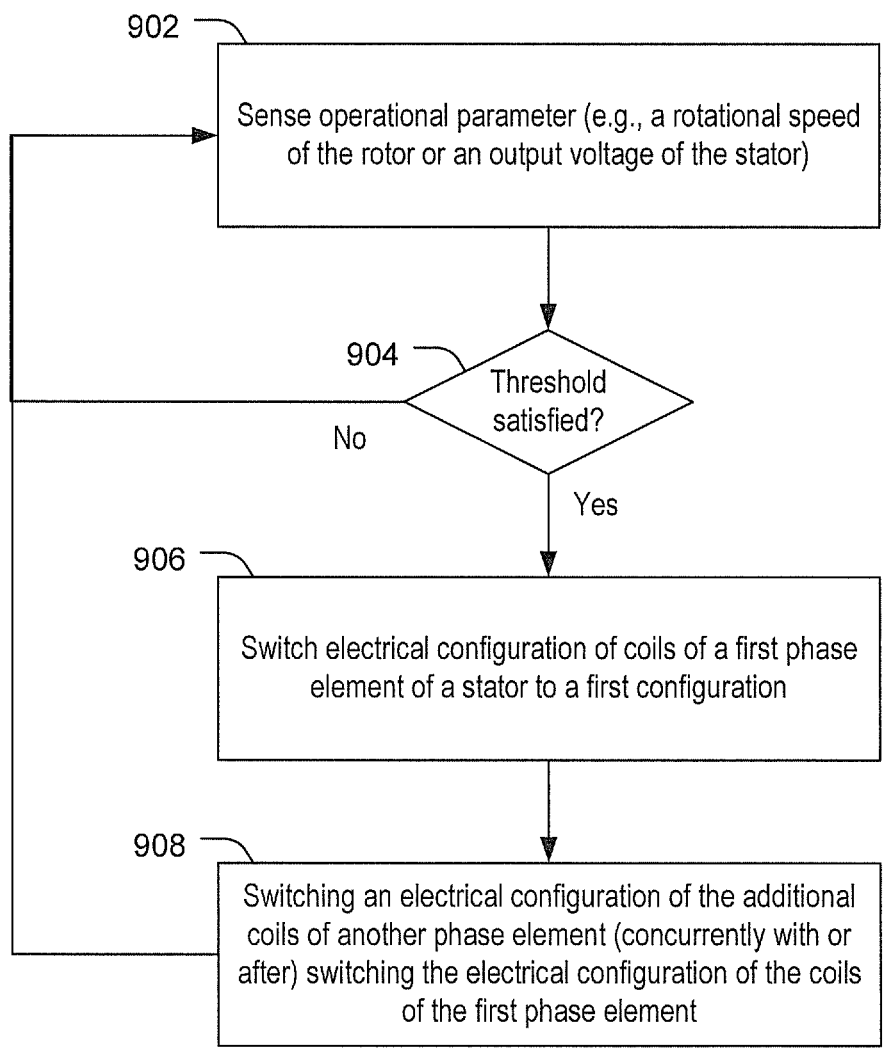
FIG. 9 is flow chart of a particular embodiment of a method of switching an electrical configuration of a stator of a conversion device.

FIG. 9 is flow chart of a particular embodiment of a method of switching an electrical configuration of a stator of a conversion device. The conversion device may include the conversion device 100 of FIGS. 1 and 2, the conversion device 606 of FIG. 6, the conversion device 700 of FIG. 7, or another conversion device. In a particular embodiment, the conversion device includes a rotor and a stator. The stator includes a plurality of coils that are arranged into one or more phase elements. For example, a first phase element may include a first coil group with at least a first coil and a second coil and a second coil group with at least a third coil and a fourth coil. The rotor may be positioned between the first coil group and the second coil group.

The method may include, at 902, sensing an operational parameter associated with the conversion device. For example, the operational parameter that is sensed may include a rotational speed of the rotor of the conversion device. In another example, the operational parameter that is sensed may include an output voltage of the stator of the conversion device.

The method may include, at 904, determining whether the sensed operation parameters satisfy a threshold. For example, the threshold may include a voltage threshold, a rotational speed threshold, or another threshold. In a particular embodiment, the threshold is selected to correspond to a voltage threshold of a power electronics unit that is coupled to the conversion device. For example, when the threshold is compared to a sensed rotational speed of the rotor, the threshold may correspond to a lowest rotation speed of the rotor for a particular stator configuration that enables the conversion device to satisfy the voltage threshold of the power electronics unit. In another example, when the threshold is compared to the output voltage of the stator, the threshold may correspond to the voltage threshold of the power electronics unit.

The method may include, at 906, switching an electrical configuration of the coils of at least the first phase element in response to the sensed operational parameter satisfying the threshold. For example, the electrical configuration of the coils may be switched in response to the output voltage of the stator satisfying the voltage threshold. In another example, the electrical configuration of the coils may be switched in response to the rotational speed of the rotor satisfying the speed threshold. To illustrate, the electrical configuration of the coils may be switched from a first configuration to a second configuration in response to the rotational speed of the rotor decreasing to less than or equal to the speed threshold. The electrical configuration of the coils may also be switched to the first configuration in response to electricity being supplied to the stator to drive motion of the rotor (e.g., when power is being added to a flywheel energy storage system).

The method may include, at 908, switching an electrical configuration of additional coils of the stator, such as coils of a second phase element. The electrical configuration of the additional coils may be switched concurrently with switching the electrical configuration of the coils of the first phase element, or the electrical configuration of the additional coils may be switched after switching the electrical configuration of the coils of the first phase element.

Thus, the method of FIG. 9 enables reconfiguration of coils of the stator of the conversion device, such as a generator or a motor. The coils may be reconfigured such that output of the conversion device (i.e., when the conversion device is operated as a generator) satisfies the threshold of the power electronics unit over a larger range of operating speeds than would be supported if the coils were not reconfigured. The reconfiguration may be performed in a manner that reduces back currents between phase elements of the stator and that enables the conversion device to operate in a higher efficiency (e.g., lower resistance) configuration for as long as possible before reconfiguring the coils to enable continued operation in a lower efficiency configuration.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A device comprising:
   power connectors;
   a rotor;
   a stator comprising multiple coils arranged to form a first phase element and a second phase element, the first phase element including a first coil group including at least a first coil and a second coil, and a second coil group including at least a third coil and a fourth coil, wherein the rotor is positioned between the first coil group and the second coil group; and
   one or more switches that enable reconfiguration of the first phase element between multiple modes by switching an electrical configuration of the first coil group and the second coil group, wherein the first phase element is switchable independently of the second phase element, wherein, in a first mode of the multiple modes, the first coil group and the second coil group are arranged with the first coil in a first coil path and the second coil in a second coil path, wherein the second coil path is coupled to the power connectors in parallel with the first coil path;
   wherein the first coil group and the second coil group are arranged such that a first voltage generated across the first coil path due to relative motion of the rotor and the stator is substantially equal to a second voltage generated across the second coil path due to the relative motion and wherein, in the first mode of the multiple modes, the first coil and the fourth coil are coupled together to form a first series coil set, and wherein the first series coil set is coupled in parallel with the second coil and the third coil to the power connectors.

2. The device of claim 1, wherein the first coil is radially spaced a distance from the second coil to balance the first voltage and the second voltage, wherein the distance is adjustable to balance the first voltage and the second voltage.

3. The device of claim 1, wherein, in a second mode of the multiple modes, at least one coil of the first coil group and at least one coil of the second coil group are not coupled to the power connectors.

4. The device of claim 1, wherein a distance between the first coil and the second coil is adjustable.

5. The device of claim 1, wherein, in a second mode of the multiple modes, the first coil and the second coil are coupled together to form a second series coil set and the third coil and the fourth coil are coupled together to form a third series coil set, wherein the second series coil set and the third series coil set are coupled in parallel to the power connectors.

6. The device of claim 1, wherein, in a second mode of the multiple modes, the first coil, the second coil, the third coil and the fourth coil are coupled together to form a second series coil set that is coupled to the power connectors.

7. The device of claim 1, wherein the second phase element includes additional coil groups, and wherein the electrical configuration of the first coil group and the second coil group is different than a particular configuration of the additional coil groups when the first phase element is switched independently of the second phase element.

8. The device of claim 1, wherein the second phase element is angularly offset from the first phase element, and wherein the second phase element is reconfigurable between the multiple modes using the one or more switches.

9. A method comprising:
   switching a first electrical configuration of a first subset of coils of a first phase element of a stator to a first configuration independently of a second electrical configuration of a second subset of coils of a second phase element of the stator, wherein, in the first configuration, a first coil of the first phase element is in a first coil path and a second coil of the first phase element is in a second coil path that is coupled to power connectors in parallel to the first coil path; and
   switching the first electrical configuration of the first subset of coils of the first phase element to a second configuration, wherein, in the second configuration, the first coil and the second coil are coupled in series;
   wherein the first subset of coils of the first phase element includes a first coil group with at least the first coil and the second coil and a second coil group with at least a third coil and a fourth coil, wherein a rotor is positioned between the first coil group and the second coil group, and wherein, in the first configuration, the first coil is coupled in series with the fourth coil to form a series coil set that is coupled in parallel with at least one of the second coil or the third coil to the power connectors.

10. The method of claim 9, further comprising sensing a rotational speed of the rotor, wherein the first electrical configuration of the first subset of coils is switched to the second configuration in response to the rotational speed of the rotor decreasing to less than or equal to a speed threshold.

11. The method of claim 9, wherein the first electrical configuration of the first subset of coils is switched to the first configuration in response to electricity being supplied to the stator to drive motion of the rotor.

12. The method of claim 9, further comprising sensing an output voltage of the stator, wherein the first electrical configuration of the first subset of coils is switched in response to the output voltage satisfying a voltage threshold.

13. The method of claim 9, further comprising switching a third electrical configuration of a third subset of coils of a third phase element concurrently with switching the first electrical configuration of the first subset of coils of the first phase element.

14. The method of claim 9, wherein the second phase element is angularly offset from the first phase element, and wherein the method further comprises switching the second electrical configuration of the second subset of coils after switching the first electrical configuration of the first subset of coils of the first phase element.

15. The method of claim 9, wherein a distance between the first coil and the second coil is adjustable.

16. A system comprising:
  a conversion device configured to convert between kinetic energy and electricity, the conversion device comprising:
    power connectors to receive or output the electricity;
    a rotor including at least one magnet;
    a stator comprising multiple coils arranged to form a first phase element and a second phase element, the first phase element including a first coil group with at least a first coil and a second coil and a second coil group with at least a third coil and a fourth coil, wherein the rotor is positioned between the first coil group and the second coil group; and
    one or more switches that enable reconfiguration of the first phase element between multiple modes by switching an electrical configuration of the first coil group and the second coil group, wherein the first phase element is switchable independently of the second phase element, wherein, in at least one mode of the multiple modes, the first coil group and the second coil group are arranged with the first coil in a first coil path and the second coil in a second coil path that is coupled to the power connectors in parallel with the first coil path;
  wherein the first coil group and the second coil group are arranged such that a first voltage generated across the first coil path due to relative motion of the rotor and the stator is substantially equal to a second voltage generated across the second coil path due to the relative motion, and wherein a distance between the first coil and the second coil is adjustable; and
  a mechanical device coupled to the rotor and configured to provide kinetic energy to drive the relative motion of the rotor and the stator.

17. The system of claim 16, further comprising a controller configured to select a particular mode in which the conversion device is to operate based at least partially on a rate of the relative motion, wherein the controller is further configured to actuate the one or more switches in an order specified by a switching pattern, and wherein the order is selected to limit unbalanced forces on the rotor due to current flow through the multiple coils.

18. The system of claim 16, wherein the mechanical device comprises a flywheel, and wherein the flywheel is configured to transfer stored kinetic energy to the rotor to generate electricity and to receive kinetic energy from the rotor in response to electricity received via the power connectors.

19. The system of claim 16, wherein the mechanical device comprises a variable speed engine, and wherein the first coil is intertwined with the second coil.

20. The system of claim 16, wherein the first coil and the fourth coil are coupled together to form a series coil set in a first mode of the multiple modes, and wherein the series coil set is coupled in parallel with the second coil and the third coil to the power connectors.

* * * * *